(No Model.)

A. H. CALKINS.
OIL STOVE.

No. 408,211. Patented Aug. 6, 1889.

Witnesses:
Louis M. Whitehead
Wm. T. Fleming

Inventor:
Almon H. Calkins
by
Dayton
Poole & Brown
Attorneys.

UNITED STATES PATENT OFFICE.

ALMON H. CALKINS, OF CHICAGO, ILLINOIS.

OIL-STOVE.

SPECIFICATION forming part of Letters Patent No. 408,211, dated August 6, 1889.

Application filed February 10, 1888. Serial No. 263,633. (No model.)

*To all whom it may concern:*

Be it known that I, ALMON H. CALKINS, of Chicago, in the county of Cook and State of Illinois, have invented certain new and useful Improvements in Oil-Stoves; and I do hereby declare that the following is a full, clear, and exact description thereof, reference being had to the accompanying drawings, and to the letters of reference marked thereon, which form a part of this specification.

This invention relates to an improvement in heating and cooking apparatus of that class in which oil or other liquid hydrocarbon is used as a fuel.

The invention consists in the matters hereinafter described, and pointed out in the appended claims.

Figure 1:
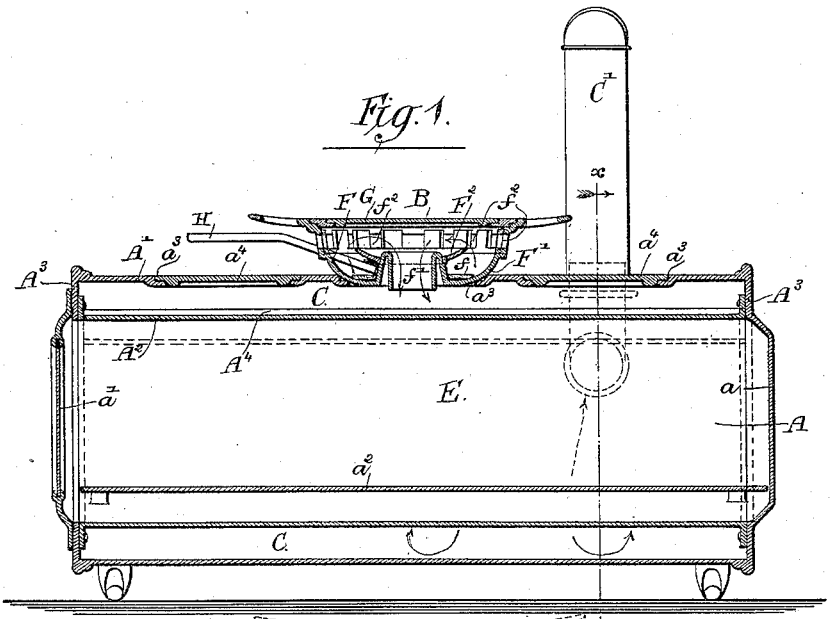
Figure 2:
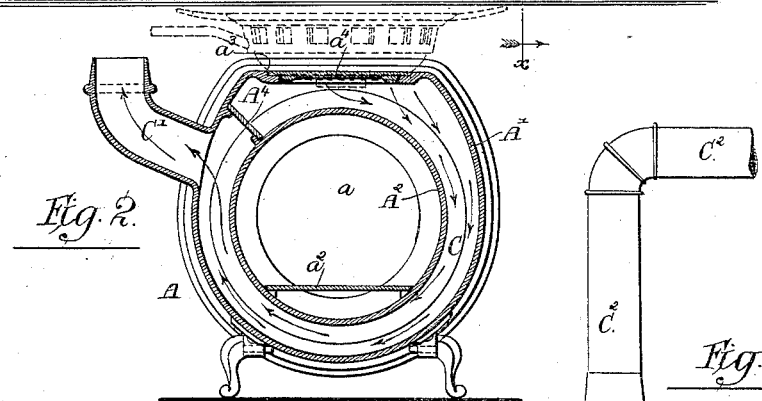
Figure 3:
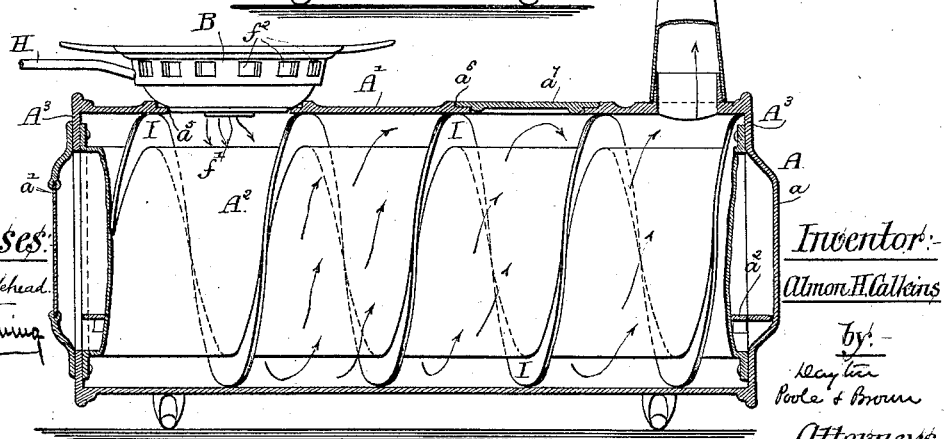

In the accompanying drawings, Figure 1 illustrates in central longitudinal vertical section a heating and cooking apparatus embodying my invention. Fig. 2 is a cross-section of the same, taken upon line $x$ $x$ of Fig. 1. Fig. 3 is a longitudinal section illustrating a modification of the same.

As shown in the said drawings, Figs. 1 and 2, A is the main part, body, or drum of my novel heating apparatus, and B is an oil-burner for the same. Said burner B is herein shown as made separate from and resting on the top of the part A. The drum A is herein shown as made cylindric in form, and said drum consists of an outer wall $A'$, an inner wall $A^2$, and two end walls $A^3$ $A^3$, said walls $A'$, $A^2$, and $A^3$ forming a narrow space C adjacent to the exterior wall of the drum, within which the heated products of combustion and flames from the burner pass on their way from the burner to the exit on smoke-pipe $C'$ of the apparatus.

The space or the chamber E inclosed by the inner wall $A^2$ is herein shown as closed at one end of an end wall $a$, and at its opposite end by a door $a'$, said space serving as an oven in which food may be cooked. When the said inner wall E is cylindric, as herein shown, a flat bottom plate $a^2$ will commonly be placed in the said space or chamber E to form a flat bottom therein. As shown in said Figs. 1 and 2, the exterior wall $A'$ of the drum A is made flat upon its top and provided with three holes $a^3$ $a^3$ $a^3$, in or over either of which the burner B may be placed. Said burner is herein shown as placed over the center hole, the end holes being closed by removable covers $a^4$ $a^4$.

The burner B illustrated is constructed and operates in the same manner as the burner illustrated in an application for Letters Patent filed by William Vogel on the 6th day of December, 1887, Serial No. 257,068. Said burner comprises an exterior basin-shaped shell F, having a rounded or conical bottom $F'$, adapted to fit into the hole $a^3$ of the drum, provided with an annular oil-receptacle $f$, and with a central downwardly-opening exit-passage $f'$, through which the flames and products of combustion from the burner may pass downwardly into the space between the walls $A'$ and $A^2$ of the drum. Said burner B is provided with a series of peripheral air-inlet openings $f^2$ $f^2$, with a deflector $F^2$, and a removable top plate G, these parts being arranged in the same manner as the corresponding parts shown in said application of William Vogel.

$A^4$ is a partition extending longitudinally of the space C of the drum A, between the holes $a^3$ $a^3$ in the top of said drum and the opening of the smoke-pipe $C'$, said smoke-pipe entering the outer wall $A'$ at the side thereof and at a point somewhat below the horizontal top of the said exterior wall. Said partition $A^4$ prevents the direct passage of flames and products of combustion from the burner to the smoke-passage, and causes such flames and products of combustion to pass entirely around the inner wall $A^2$, and chamber E, making their exit through the smoke-pipe.

In the operation of the apparatus shown in said Figs. 1 and 2 oil is supplied to the burner continuously through an oil-supply pipe H, and is consumed in the annular oil trough or receptacle $f$ of the burner. The flames and products of combustion pass out of the burner through the exit-opening $F'$ in the bottom thereof and enter the space or chamber of the drum between the outer and inner walls $A'$ $A^2$ thereof, passing around the said drum and making their exit from the smoke-pipe $C'$. The passage of the flames around the drum serves to heat the exterior wall thereof, thereby affording a large area of effective heating-surface for warming the room in which the apparatus is placed. The passage of flames and products of combustion through the exterior space of the drum also serves to maintain the interior chamber or oven E thereof at a high temperature, thereby making the apparatus efficient for roasting or baking.

The cover G of the burner may be removed and cooking utensils placed over the burner, so that said burner may be used for cooking in the same manner as is the burner shown in said prior application of William Vogel. The flat top of the drum, however, affords additional space for the support of cooking utensils, the covers $a^4$ $a^4$ enabling the vessels placed upon the said flat top of the drum to be exposed directly to the flames and heated products of combustion passing from the burner into the space C of the drum.

In Fig. 3 I have shown a construction in a heating and cooking apparatus somewhat different from that before described. In this instance the drum A comprises an outer wall A' and an inner wall $A^2$, together with end walls $A^3$ $A^3$, arranged in the same manner as before described. In this instance, however, a spirally-coiled partition I is located in the space between the inner and outer walls of the drum in such manner as to form a spiral duct or passage extending from one end to the other of the said drum. In the top of the outer wall A of the drum, near one end of the latter, is located a hole or opening $a^5$, over which is placed a burner D, like that shown in Figs. 1 and 2, while at the opposite end of the drum the smoke-pipe $C^2$ is connected with the exterior wall A' there. The flames and products of combustion from the burner B in this instance pass downwardly into the spiral duct or passage formed by the partition I, and move along said passage toward the smoke-pipe C', passing around and around the drum as they move endwise of the latter until said smoke-passage is reached. Said spiral partition I is constructed and operates substantially in the same manner as does a similar partition described and claimed in another application for patent filed simultaneously herewith. The drum in Fig. 3 may be provided in its top with a hole $a^6$, having a cover $a^7$, affording a place at which a cooking utensil may be heated by direct contact therewith of the flames and products of combustion, passing through the spiral duct toward the smoke-pipe.

One main feature of novelty embraced in my invention is embodied in the construction herein shown, wherein a drum having a large heating-area and provided with interior tortuous or convoluted passages for the flames and products of combustion is employed in connection with a burner having an exit-opening in its bottom, and which rests upon the said drum, thereby affording a cheap and simple apparatus adapted for both heating and cooking. In carrying out this part of my invention an apparatus embracing these parts may be made either in the particular manner herein shown or otherwise.

Another main feature of novelty embraced in my invention consists in the drum having inner and outer walls forming an interior chamber or oven, combined with a burner the exit-opening of which is connected with the space between the said walls; and this construction is herein claimed without restriction to the construction herein illustrated in the burner itself or its location with relation to the drum.

Other novel features illustrated in the drawings and above described are also herein specifically claimed as part of my invention.

I claim as my invention—

1. The novel heating apparatus herein described, consisting of a drum comprising inner and outer tubular walls and provided with a partition between said walls, forming a tortuous smoke-passage, and with a smoke-flue communicating with one end of said passage, and an opening in the said drum communicating with the other end of said passage, and a separate burner having an exit-opening in its bottom for flames and products of combustion and adapted to fit into said opening, substantially as described.

2. The novel heating apparatus herein described, consisting of a drum comprising inner and outer tubular walls and provided with a partition between said walls, forming a tortuous smoke-passage, and with a smoke-flue communicating with one end of said passage and an opening in its top communicating with the opposite end of said passage, a separate burner having an exit-opening in its bottom for flames and products of combustion and adapted to fit into said opening, the space inclosed by the inner tubular walls being provided with a horizontal flooring, thereby forming an oven, substantially as described.

In testimony that I claim the foregoing as my invention I affix my signature in presence of two witnesses.

ALMON H. CALKINS.

Witnesses:
C. CLARENCE POOLE,
O. N. WILLIS.